US009699755B2

(12) United States Patent
Cho et al.

(10) Patent No.: US 9,699,755 B2
(45) Date of Patent: Jul. 4, 2017

(54) METHOD AND APPARATUS FOR REGISTERING ACCESS POINT IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/758,154

(22) PCT Filed: Nov. 12, 2013

(86) PCT No.: PCT/KR2013/010212
§ 371 (c)(1),
(2) Date: Jun. 26, 2015

(87) PCT Pub. No.: WO2014/115959
PCT Pub. Date: Jul. 31, 2014

(65) Prior Publication Data
US 2015/0334675 A1     Nov. 19, 2015

Related U.S. Application Data

(60) Provisional application No. 61/757,226, filed on Jan. 27, 2013.

(51) Int. Cl.

| | | |
|---|---|---|
| H04M 1/663 | (2006.01) | |
| H04M 1/725 | (2006.01) | |
| H04W 40/00 | (2009.01) | |
| H04W 72/00 | (2009.01) | |
| H04W 60/04 | (2009.01) | |
| H04W 24/02 | (2009.01) | |
| H04W 48/16 | (2009.01) | |
| H04W 88/08 | (2009.01) | |
| H04W 48/08 | (2009.01) | |
| H04W 84/12 | (2009.01) | |

(52) U.S. Cl.
CPC ........... *H04W 60/04* (2013.01); *H04W 24/02* (2013.01); *H04W 48/16* (2013.01); *H04W 48/08* (2013.01); *H04W 84/12* (2013.01); *H04W 88/08* (2013.01)

(58) Field of Classification Search
None
See application file for complete search history.

(56) References Cited

U.S. PATENT DOCUMENTS

2008/0075112 A1* 3/2008 Hu ...................... H04L 12/4633
370/466
2009/0268664 A1* 10/2009 Hirano .................. H04W 8/082
370/328
(Continued)

FOREIGN PATENT DOCUMENTS

KR    10-2010-0087757      8/2010
WO      2009/067454        5/2009
(Continued)

OTHER PUBLICATIONS

PCT International Application No. PCT/KR2013/010212, Written Opinion of the International Searching Authority dated Feb. 26, 2014, 1 page.
(Continued)

*Primary Examiner* — Moustapha Diaby
(74) *Attorney, Agent, or Firm* — Lee Hong Degerman Kang Waimey

(57) ABSTRACT

A method and apparatus of registering an entity of a secondary radio access technology (RAT) system in a management device of a primary RAT system in a wireless communication system is provided. The primary RAT system may be a cellular system, and the management device of the primary RAT system may be one of eNodeB (eNB), mobility management entity (MME), or a new entity. The second RAT system may be a wireless local area network (WLAN)
(Continued)

system, and the entity of the secondary RAT system may be an access point (AP). The AP registration method may be initiated by the AP, or a general device, e.g., a multi radio access technology (RAT) device supporting a plurality of RATs.

6 Claims, 13 Drawing Sheets

(56) References Cited

U.S. PATENT DOCUMENTS

| | | | |
|---|---|---|---|
| 2010/0075680 A1* | 3/2010 | Ramachandran | H04W 60/00 455/436 |
| 2011/0280227 A1 | 11/2011 | McCann et al. | |
| 2011/0320588 A1 | 12/2011 | Raleigh | |
| 2012/0022968 A1* | 1/2012 | Manku | G06Q 30/0613 705/26.41 |
| 2012/0108287 A1 | 5/2012 | Hamel et al. | |
| 2014/0073289 A1* | 3/2014 | Velasco | H04W 12/04 455/411 |
| 2014/0141779 A1 | 5/2014 | Yuk et al. | |

FOREIGN PATENT DOCUMENTS

| | | |
|---|---|---|
| WO | 2011/110108 | 9/2011 |
| WO | 2012/047020 | 4/2012 |
| WO | 2013/009111 | 1/2013 |

OTHER PUBLICATIONS

European Patent Office Application No. 13872835.7, Search Report dated Aug. 2, 2016, 9 pages.

* cited by examiner

FIG. 4

| Frame control | Persistent /ID | Address 1 | Address 2 | Address 3 | Sequence control | Address 4 | Sequence control | QoS control | HT control | Frame body | FCS |

METHOD AND APPARATUS FOR REGISTERING ACCESS POINT IN WIRELESS COMMUNICATION SYSTEM

CROSS-REFERENCE TO RELATED APPLICATIONS

This application is the National Stage filing under 35 U.S.C. 371 of International Application No. PCT/KR2013/010212, filed on Nov. 12, 2013, which claims the benefit of U.S. Provisional Application No. 61/757,226, filed on Jan. 27, 2013, the contents of which are all hereby incorporated by reference herein in their entirety.

BACKGROUND OF THE INVENTION

Field of the Invention

The present invention relates to wireless communications, and more specifically, to a method and apparatus for registering an access point (AP) in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless LAN (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In a fifth-generation mobile communication system constituted of a plurality of RATs, a primary RAT system needs to grasp the entities of a secondary RAT system that operates within its own coverage. For example, in case that a primary RAT system is a cellular system, and a secondary RAT system is a Wi-Fi system, a cellular node such as an eNodeB (eNB), mobility management entity (MME), or new cellular entity need be aware of which access points (APs) are in operation within its coverage. Accordingly, when sensing a secondary RAT system entity, a user equipment need let the cellular node know AP information. Further, a need exists for a method for efficiently registering an AP in the cellular node based on the AP information.

SUMMARY OF THE INVENTION

The present invention provides a method and apparatus for registering an AP in a wireless communication system. The present invention provides a method for transmitting, by the AP, information on the AP to a cellular node through a Wi-Fi radio interface with a general device or a cellular radio interface of the general device. Further, the present invention provides a method for transmitting, by a general device, information on an AP, which has been sensed by the general device through a Wi-Fi radio interface, to a cellular node.

In an aspect, a method of registering, by a multi radio access technology (RAT) device supporting a plurality of RATs, an entity of a secondary RAT system in a management device of a primary RAT system in a wireless communication system is provided. The method includes receiving a request for registration of an entity of a secondary RAT system from the entity of the secondary RAT system, if the request for registration is authorized, determining whether the entity of the secondary RAT system is included in a list of entities of the secondary RAT system registered in a management device of a primary RAT system, if it is determined that the entity of the secondary RAT system is not included in the list, transmitting a registration request message including information on the entity of the secondary RAT system to the management device of the primary RAT system, receiving a registration response message including a result of the request for registration of the entity of the secondary RAT system from the management device of the primary RAT system, and transmitting a registration result parameter including the result of the registration of the entity of the secondary RAT system to the entity of the secondary RAT system.

The request for registration of the entity of the secondary RAT system may be an access point (AP) registration request flag included in a beacon frame, a probe response frame, an authentication response frame, or an association response frame.

The request for registration of the entity of the secondary RAT system may be a newly defined AP registration request frame.

The information on the entity of the secondary RAT system may include at least one of a media access control (MAC) address of the entity of the secondary RAT system, a service set identifier (SSID) of the entity of the secondary RAT system, a position of the entity of the secondary RAT system, an homogeneous extended service set ID (HESSID) of the entity of the secondary RAT system, whether of the entity of the secondary RAT system can be used by a limited user, or information on a frequency channel used by the entity of the secondary RAT system.

The result of the request for registration of the entity of the secondary RAT system may be one of 'already registered,' 'success,' or 'failure'. If the result of the request for registration of the entity of the secondary RAT system is 'failure,' the registration result parameter may further include cause for the result of the request for registration.

The primary RAT system may be a cellular system, and the management device of the primary RAT system may be one of an eNodeB (eNB), a mobility management entity (MME), or a new entity of the cellular system.

The secondary RAT system may be a Wi-Fi system, and the entity of the secondary RAT system may be an AP.

In another aspect, a method of registering, by a multi radio access technology (RAT) device supporting a plurality of RATs, an entity of a secondary RAT system in a management device of a primary RAT system in a wireless communication system is provided. The method includes receiving a first frame from an entity of a secondary RAT system. A request for registration of the entity of the secondary RAT system and information on the entity of the secondary RAT system are encapsulated in the first frame. The method further include transmitting a registration request message including the request for registration of the entity of the secondary RAT system and the information on the entity of the secondary RAT system to a management device of a primary RAT system, receiving a registration response message including a result of the request for registration of the entity of the secondary RAT system from the management device of the primary RAT system, and transmitting a second frame to the entity of the secondary RAT system, wherein the result of the request for registration of the entity of the secondary RAT system is encapsulated in the second frame.

The first frame may include a field indicating that the first frame is transmitted to the management device of the primary RAT system.

The registration response message may indicate that the registration response message is transmitted to the entity of the secondary RAT system.

In another aspect, a method of registering, by a multi radio access technology (RAT) device supporting a plurality of RATs, an entity of a secondary RAT system in a management device of a primary RAT system in a wireless communication system is provided. The method includes discovering an entity of a secondary RAT system through scanning, transmitting a registration request message including information on the entity of the secondary RAT system to a management device of a primary RAT system, and receiving a registration response message including a result of the request for registration of the entity of the secondary RAT system from the management device of the primary RAT system.

The method may further include transmitting a request for a list of entities of a secondary RAT system registered in the management device of the primary RAT system to the management device of the primary RAT system.

In a convergence communication system of a cellular system and a Wi-Fi system, a cellular node may efficiently grasp a Wi-Fi system entity that operates within its coverage.

BRIEF DESCRIPTION OF THE DRAWINGS

FIG. 4 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
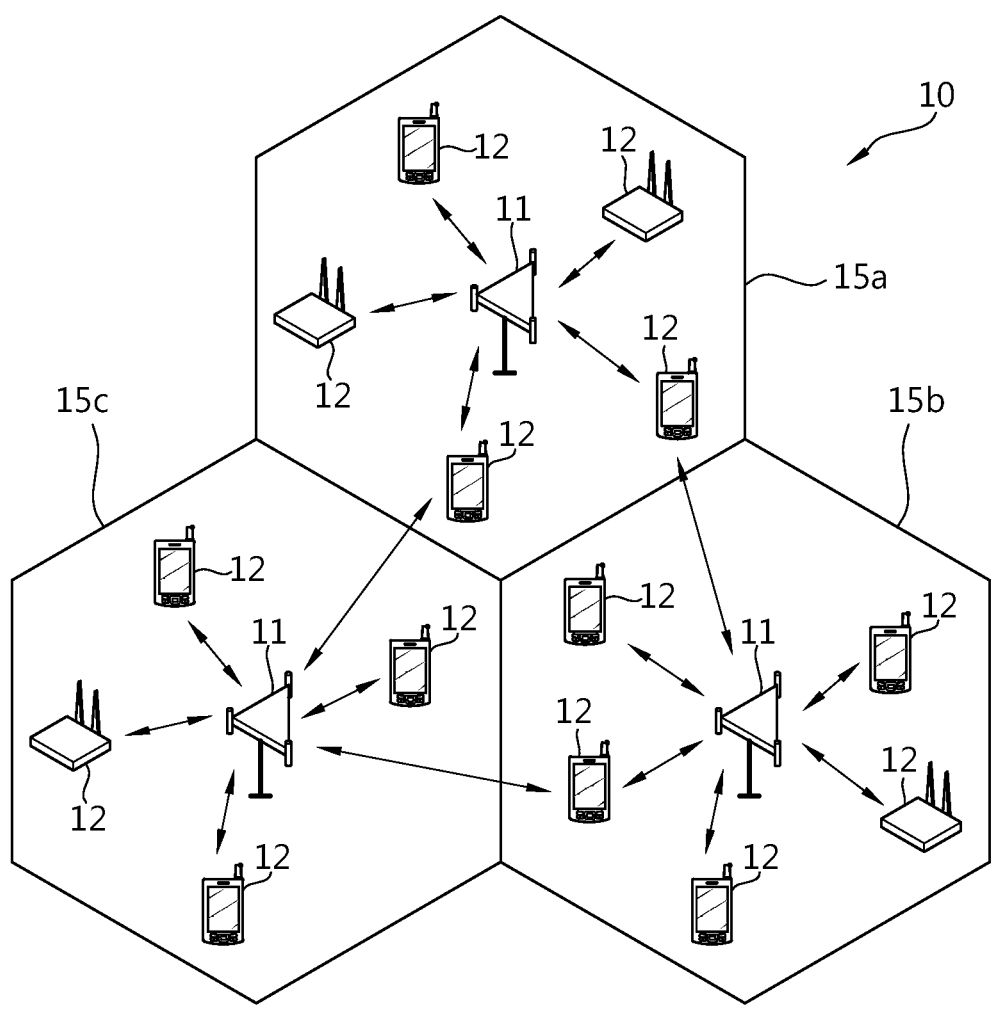
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
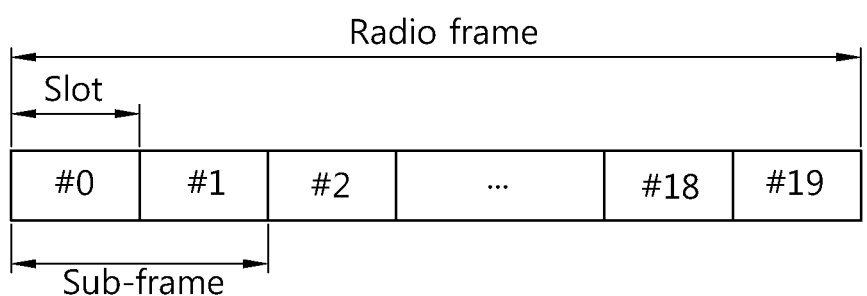
FIG. 2 shows a structure of a radio frame in 3GPP LTE.

FIG. 2 shows a structure of a radio frame in 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
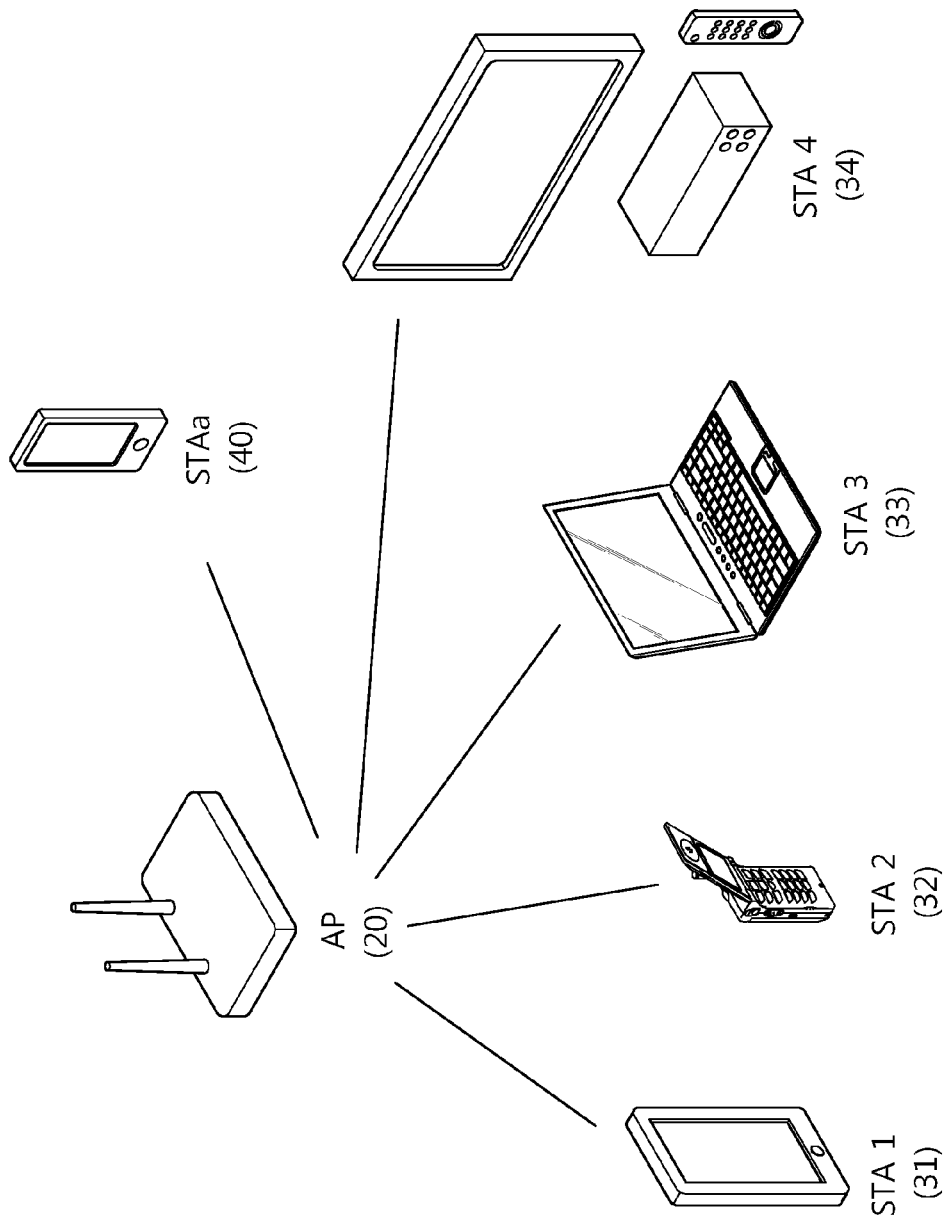
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
| --- | --- | --- |
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
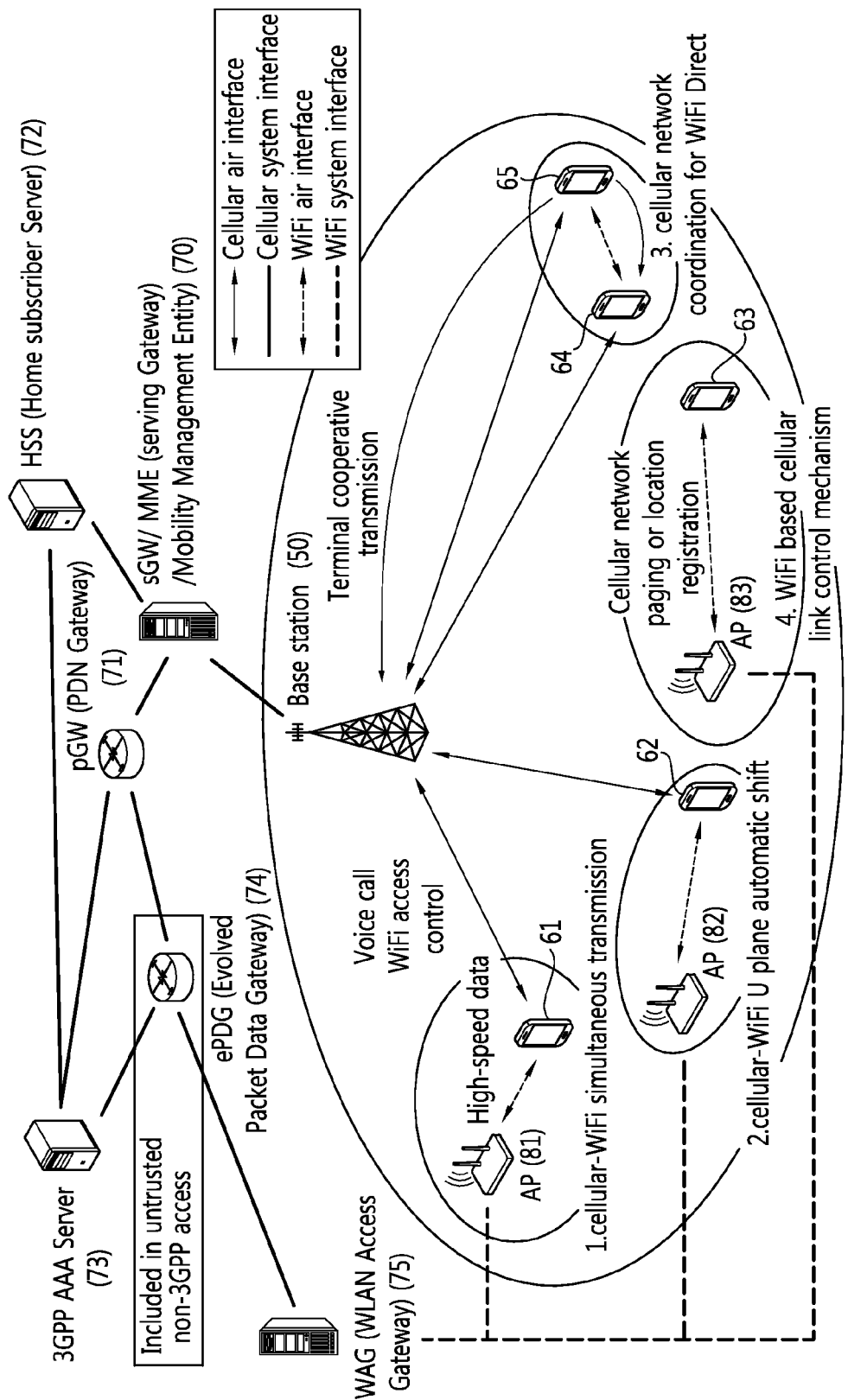
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and an home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (e-PDG) 74 through the cellular system interface. The e-PDG 74 may be included only in untrusted non-3GPP access. The e-PDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station

50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

A method for a cellular node obtaining information on an AP through an AP registration procedure according to an embodiment of the present invention is described. The AP registration procedure according to an embodiment of the present invention may be generally classified into an AP registration procedure initiated by an AP (AP initiated AP registration) and an AP registration procedure initiated by a general device such as a user equipment or a multi radio access technology (multi-RAT) device (device initiated AP registration). Hereinafter, the cellular node may be a new entity of a cellular system, eNB, or MME. Further, the general device may also be referred to as a user equipment or multi-RAT device.

Figure 6:
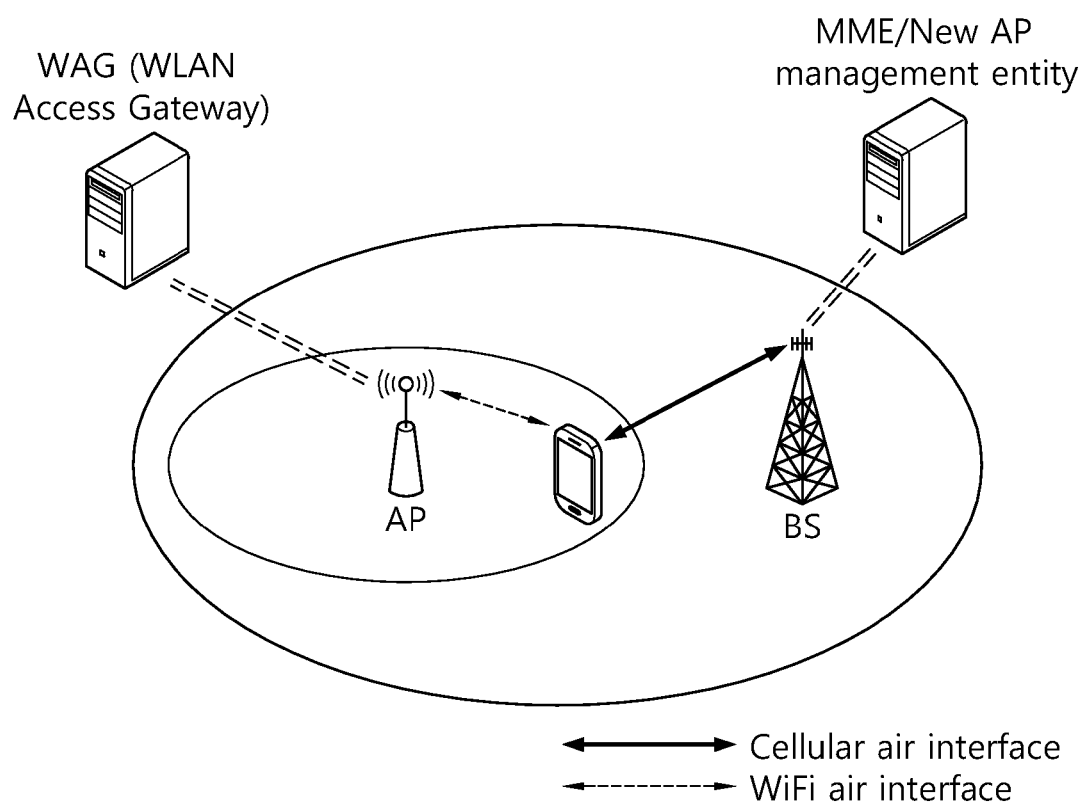
FIG. 6 shows an example of a scenario to which an AP registration method according to an embodiment of the present invention may be applied.

FIG. 6 shows an example of a scenario to which an AP registration method according to an embodiment of the present invention may be applied. Referring to FIG. 6, a general device communicates with a base station through a cellular radio interface and with an AP through a Wi-Fi radio interface. The base station is connected to an MME or a new AP management entity. The AP is connected to a WAG.

First, an AP registration procedure initiated by an AP according to an embodiment of the present invention is described.

Figure 7:
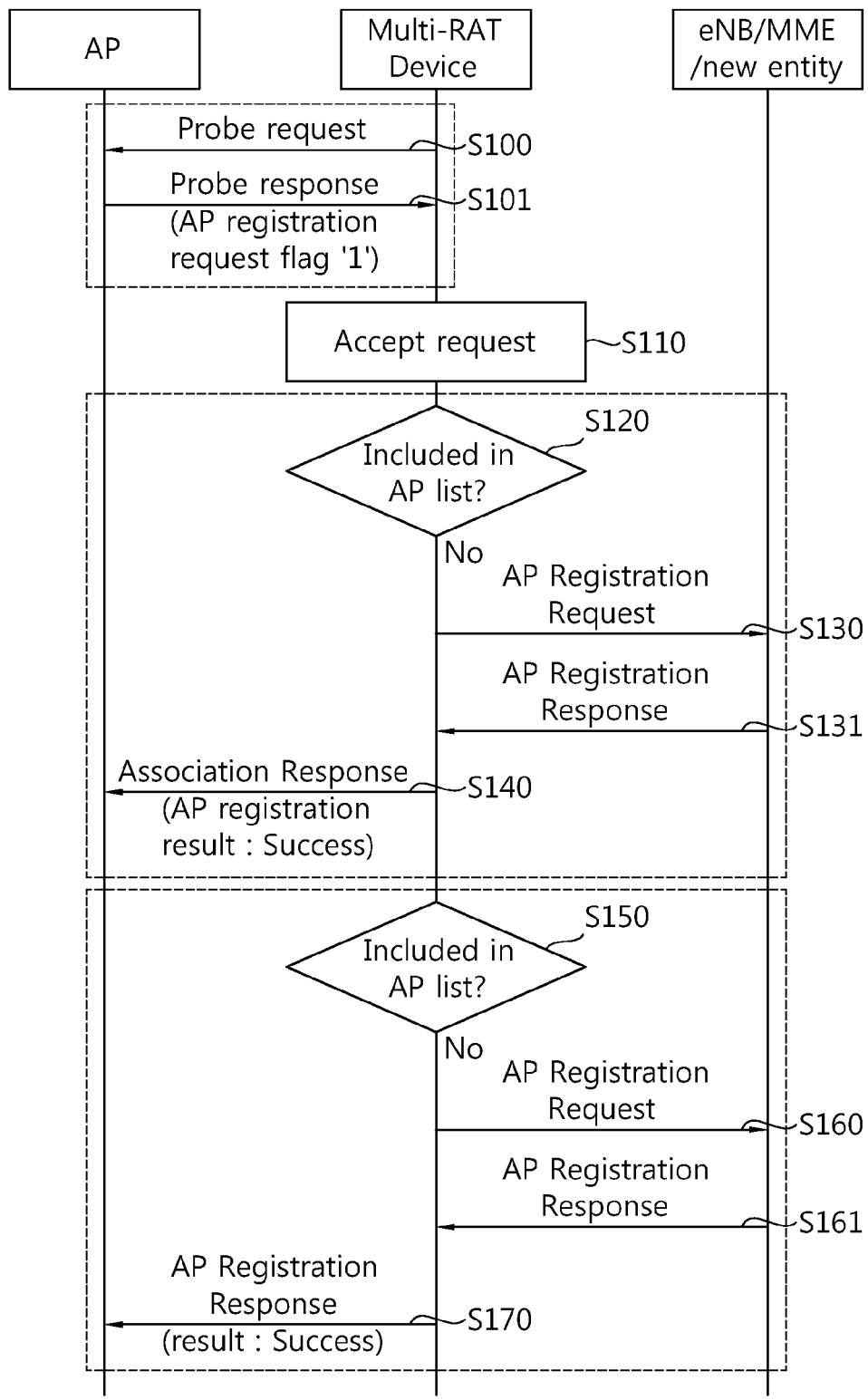
FIG. 7 shows an AP registration method according to an embodiment of the present invention.

FIG. 7 shows an AP registration method according to an embodiment of the present invention. The embodiment described in FIG. 7 indicates an AP registration method by which an AP requests its registration using an existing Wi-Fi system frame as is.

In step S100, a multi-RAT device transmits a probe request frame to an AP. In step S101, the AP transmits to the multi-RAT device a probe response frame including an AP registration request flag, as a response to the probe request frame. The AP registration request flag indicates a request for AP registration to a cellular node. When indicating the AP registration request, a value of the AP registration request flag may be 1. The AP registration request flag is merely an example, and other parameters may be included in the probe response frame in order to indicate the AP registration request. The probe response frame may further include information on whether a re-transmission procedure request is made as the AP registration request fails.

Further, although in the embodiment described in FIG. 7 the AP requests its registration using a probe response frame, the present invention is not limited thereto. The AP may transmit an AP registration request flag through a beacon frame, an authentication frame or an association frame other than the probe frame. Transmitting the AP registration request flag through a probe frame and a beacon frame may correspond to an untrusted method because a request for AP registration is transmitted to an unspecific, unauthenticated device. Transmitting an AP registration request flag through an authentication frame or an association frame may correspond to a trusted method because a request for AP registration is transmitted to an authenticated specific device. However, if a probe frame is transmitted in a unicast manner and is transmitted after authenticated, this may correspond to a trusted method.

In step S110, the multi-RAT device authorizes the AP registration request received from the AP. If the multi-RAT device authorizes the AP registration request while in an idle mode, the multi-RAT device may shift to an active mode.

If the multi-RAT device does not authorize the AP registration request, the multi-RAT device may transmit an AP registration result parameter or a newly defined AP registration response frame to the AP. At this time, the AP registration result parameter or AP registration response frame may include a result ('failure') of the AP registration request and cause for the failure. The cause for the multi-RAT device not to authorize the AP registration request may be when cannot support the request from the AP ('not support') or when the multi-RAT device and the cellular system are not in the proper state for authorizing the AP registration request and thus cannot fulfill the request from the AP ('not suitable').

If the multi-RAT device authorizes the AP's registration request, in step S120, the multi-RAT device determines whether the corresponding AP is included in a latest valid AP list. That is, if the multi-RAT device has a latest valid AP list that has been received from the cellular node, the multi-RAT device identifies whether the AP that has requested registration is included in the AP list. Accordingly, the multi-RAT device may grasp whether the cellular node already manages the AP that has requested registration. If the multi-RAT device does not have an AP list, or if the multi-RAT device has an AP list but the AP list is invalid, the multi-RAT device may transmit a request for a latest valid AP list to the cellular node.

If the AP that has requested registration is included in a latest valid AP list, the multi-RAT device may transmit an AP registration result parameter or a newly defined AP registration response frame to the AP. At this time, the AP registration result parameter or AP registration response frame may include a result ('already registered') of the AP registration request.

If the AP is not included in the latest valid AP list, in step S130, the multi-RAT device transmits an AP registration request message to the cellular node. The AP registration request message may include AP information such as a MAC address of the AP, SSID of the AP, whether only a limited user may use the AP (closed subscriber group (CSG)/password or open subscriber group (OSG)), position of the AP, homogeneous ESS ID (HESSID) of the AP, information on the frequency channel used by the AP (operating class or channel number), which have been obtained through a Wi-Fi scanning procedure. If the cellular node is a base station, the AP registration request message may be a radio resource control (RRC) message. If the cellular node is an MME, the AP registration request message may be a non-access stratum (NAS) message.

Upon receiving the AP registration request message from the multi-RAT device, the cellular node stores the AP information included in the AP registration request message. The cellular node may be implicitly aware of which coverage a corresponding AP belongs to according to the transmission path of the AP registration request message. For example, if the cellular node is an MME, the AP registration request message is transmitted from the multi-RAT device to an eNB that provides a serving cell of the multi-RAT device, and the MME may receive the AP registration request message from the eNB. Since the MME has received the AP registration request message from the eNB, the MME may determine that the corresponding AP is within the coverage of the eNB.

In step S131, the cellular node transmits an AP registration response message to the multi-RAT device as a response to the AP registration request message. The AP registration response message includes a result of the AP's registration request. For example, the result of 0x00 denotes 'already registered,' the result of 0x01 denotes 'success,' and the result of 0x02 denotes 'failure.'

Further, the AP registration response message may include a list of registered APs. For example, if the AP that has transmitted a request for registration has been already registered, the cellular node may determine that the multi-RAT device does not have a latest valid AP list. Accordingly, by transmitting an AP registration response message including an AP list to the multi-RAT device, the multi-RAT device may be rendered to update the AP list. Or, the cellular node may transmit a registered APs list to a plurality of multi-RAT devices in a broadcast or unicast manner.

If the multi-RAT device receives, within a predetermined time, an acknowledgement of the AP registration request message transmitted in step S130 or the AP registration response message transmitted from the cellular node in step S131, in step S140, the multi-RAT device transmits an association response frame to the AP. The association response frame may include an AP registration result parameter. The AP registration result parameter indicates a response to the AP registration request. That is, the AP registration result parameter includes a result for the AP's registration request and cause for the result. For example, if the result for the AP registration request is 0x00, this denotes 'already registered,' if the result is 0x01, this denotes 'success,' and if the result is 0x02, this denotes 'failure.' In the embodiment described in FIG. 7, the result for the AP registration request denotes 'success.' Meanwhile, an existing probe frame or authentication frame, instead of the association frame, may be used for transmitting an AP registration result parameter.

The cause for the result of the AP registration request may be one mainly for when the result is 'failure.'. That is, if the result is 'already registered' or 'success,' the cause for the AP registration request result may be omitted or set as a meaningless value. Examples of the cause for the AP registration request result are as follows.

Not support: denotes that the multi-RAT device cannot support the AP's registration request.

Not suitable: denotes that the multi-RAT device and the cellular system are not in the proper state for authorizing the AP's registration request so that they cannot fulfill the AP registration request.

Not response with retry procedure: denotes that, when failing to receive an acknowledgement the AP registration request message transmitted from the multi-RAT device in step S130 or failing to receive the AP registration response message transmitted from the cellular node in step S131 within a predetermined time, the multi-RAT device performs a re-transmission procedure therefor.

Not response without retry procedure: denotes that, when failing to receive an acknowledgement the AP registration request message transmitted from the multi-RAT device in step S130 or failing to receive the AP registration response message transmitted from the cellular node in step S131 within a predetermined time, the multi-RAT device does not perform a re-transmission procedure therefor.

Not registered: denotes that a result of response of the cellular node to the AP registration request is 'failure.'

If the multi-RAT device fails to receive, from the cellular node, an acknowledgement of the AP registration request message or the AP registration response message within a predetermined time, the multi-RAT device may transmit the AP registration result parameter to the AP, thereby performing a retransmission procedure. At this time, the AP registration result parameter may include a result of the AP registration request ('failure') and cause for the result ('not response with retry procedure'). In case of failing to receive, within a predetermined time, an acknowledgement of the AP registration request message or the AP registration response message from the cellular node despite attempting the retransmission procedure by the maximum number of times of retransmission, the multi-RAT device may transmit the AP registration result parameter to the AP. At this time, the AP registration result parameter may include a result of the AP registration request ('failure') and cause for the result ('not response without retry procedure').

Upon receiving the AP registration result parameter whose result is 'already registered' or 'success' from the multi-RAT device, the AP may determine that its request has been successfully done. Upon receiving the AP registration result parameter with a result of 'failure' and cause for the result of 'Not support,' 'Not suitable,' or 'Not response without retry procedure' from the multi-RAT device, the AP may retransmit a request for AP registration to another multi-RAT device. Upon receiving the AP registration result parameter with a result of 'failure' and cause for result of 'Not response with retry procedure,' from the multi-RAT device, the AP may await an additional response from the corresponding multi-RAT device. Upon receiving the AP registration result parameter with a result of 'failure' and cause for result of 'Not registered,' from the multi-RAT device, the AP may stop transmitting a request for AP registration.

Or, the multi-RAT device may transmit a newly defined AP registration response frame, instead of the association response frame to the AP. In step S150, the multi-RAT device determines whether the corresponding AP is included in the latest valid AP list. This is the same as step S120. If the AP is not included in the latest valid AP list, in step S160, the multi-RAT device transmits an AP registration request message to the cellular node. This is the same as step S130. In step S131, the cellular node transmits an AP registration response message to the multi-RAT device as a response to the AP registration request message. This is the same as step S131.

If the multi-RAT device receives an acknowledgement of the AP registration request message transmitted in step S160 or receives the AP registration response message transmitted from the cellular node in step S161 within a predetermined time, in step S170, the multi-RAT device transmits the AP registration response frame to the AP. The AP registration response frame indicates a response to the AP registration request. That is, the AP registration response frame includes a result of the AP registration request and cause for the result. For example, the result of the AP registration request being 0x00 denotes 'already registered,' the result being 0x01 denotes 'success,' and the result being 0x02 denotes 'failure.' In the embodiment described in FIG. 7, the result of the AP registration request denotes 'success.'

The cause for the result of the AP registration request may be one mainly for when the result is 'failure.' That is, if the result is 'already registered' or 'success,' the cause for result of the AP registration request may be omitted or may be set as a meaningless value. Examples of the cause for the result of AP registration request are as follows.

Not support: denotes that the multi-RAT device cannot support the AP's registration request.

Not suitable: denotes that the multi-RAT device and the cellular system are not in the proper state for authorizing the AP's registration request so that they cannot fulfill the AP registration request.

Not response with retry procedure: denotes that, when failing to receive an acknowledgement the AP registration request message transmitted from the multi-RAT device in step S130 or failing to receive the AP registration response message transmitted from the cellular node in step S131 within a predetermined time, the multi-RAT device performs a re-transmission procedure therefor.

Not response without retry procedure: denotes that, when failing to receive an acknowledgement the AP registration request message transmitted from the multi-RAT device in step S130 or failing to receive the AP registration response message transmitted from the cellular node in step S131 within a predetermined time, the multi-RAT device does not perform a re-transmission procedure therefor.

Not registered: denotes that a result of response of the cellular node to the AP registration request is 'failure.'

If the multi-RAT device fails to receive an acknowledgment of the AP registration request message or fails to receive the AP registration response message from the cellular node within a predetermined time, the multi-RAT device transmits the AP registration response frame to the AP, thereby performing a retransmission procedure. At this time, the AP registration response frame may include a result of the AP registration request ('failure') and cause for the result ('not response with retry procedure'). In case of failing to receive an acknowledgement of the AP registration request message or failing to receive the AP registration response message from the cellular node within a predetermined time despite attempting the retransmission procedure by the maximum number of times of retransmission, the multi-RAT device may transmit the AP registration response frame to the AP. At this time, the AP registration response frame may include a result of the AP registration request ('failure') and cause for the result ('not response without retry procedure').

Upon receiving the AP registration response frame whose result is 'already registered' or 'success' from the multi-RAT device, the AP may determine that its request has been successfully done. Upon receiving the AP registration response frame with a result of 'failure' and cause for the result of 'Not support,' 'Not suitable,' or 'Not response without retry procedure' from the multi-RAT device, the AP may retransmit a request for AP registration to another multi-RAT device. Upon receiving the AP registration response frame with a result of 'failure' and cause for result of 'Not response with retry procedure,' from the multi-RAT device, the AP may await an additional response from the corresponding multi-RAT device. Upon receiving the AP registration response frame with a result of 'failure' and cause for result of 'Not registered,' from the multi-RAT device, the AP may stop transmitting a request for AP registration.

Figure 8:
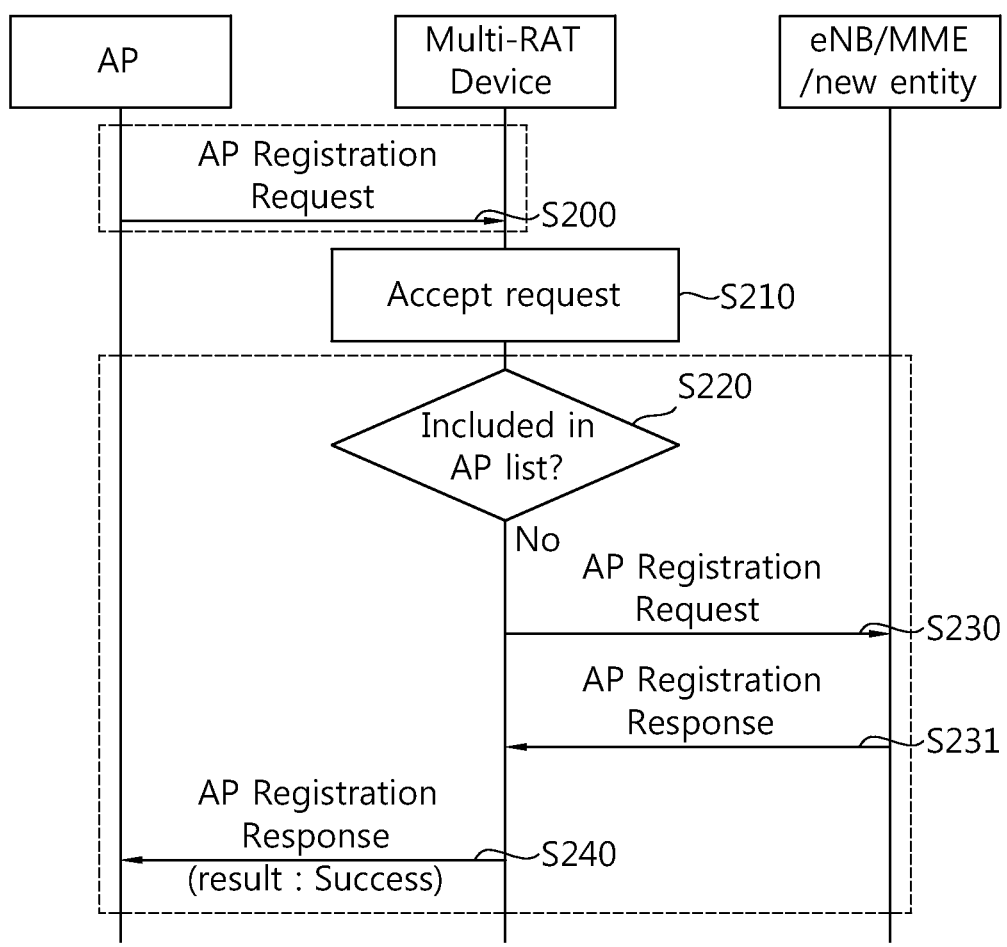
FIG. 8 shows an AP registration method according to another embodiment of the present invention.

FIG. 8 shows an AP registration method according to another embodiment of the present invention. In the embodiment described in FIG. 8, an AP registration method is described where an AP defines a new Wi-Fi system frame and requests its registration. As a new Wi-Fi system frame for AP registration, an AP registration request/response frame may be defined.

In step S200, the AP transmits an AP registration request frame to a multi-RAT device to request from the multi-RAT device, which receives the AP registration request frame, to register the AP in a cellular node. The AP registration request frame is a frame newly defined for requesting registration of the AP in the cellular node. The AP registration request frame is merely an example, and other frames for requesting AP registration may be defined as well.

Figure 9:
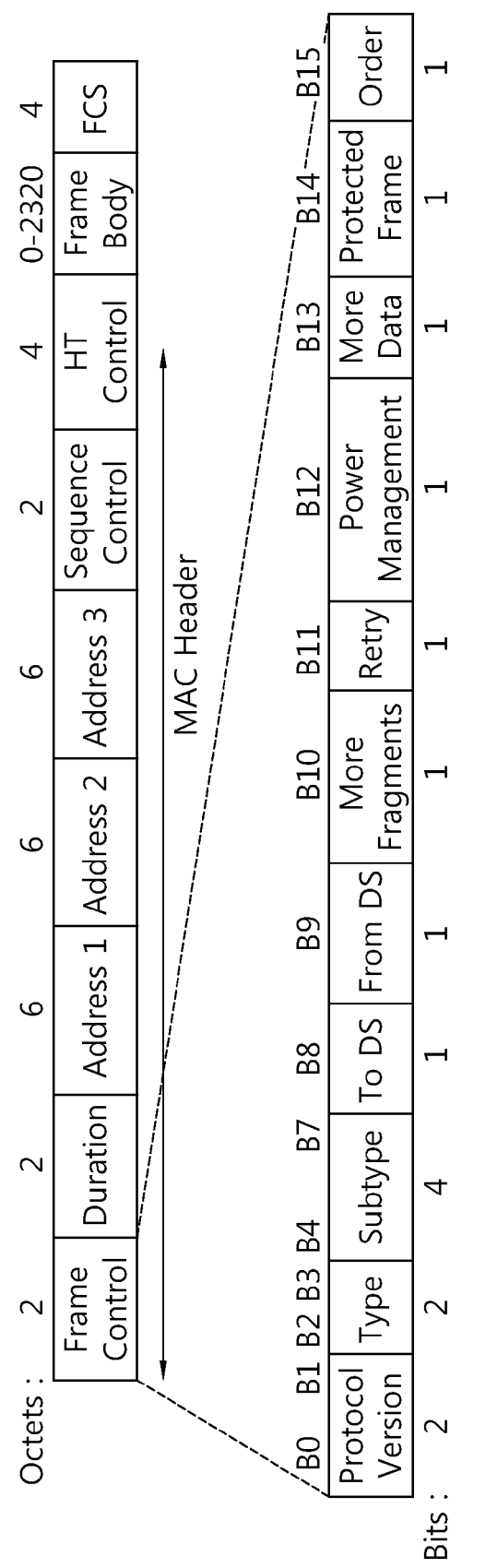
FIG. 9 shows an example of an AP registration request frame structure according to an embodiment of the present invention.

FIG. 9 shows an example of an AP registration request frame structure according to an embodiment of the present invention.

Referring to FIG. 9, the AP registration request frame may be used, as is, in the form of an existing management frame as standardized in IEEE 802.11. In other words, the AP registration request frame, like the IEEE 802.11 management frame, may include a frame control field, a duration/ID field, an address 1 field, an address 2 field, an address 3 field, a sequence control field, an HT control field, a frame body field, and an FCS field.

Further, the frame control field may include a protocol version subfield, a type subfield, a subtype subfield, a to DS subfield, a from DS subfield, a more fragments subfield, a retry subfield, a power management subfield, a more data subfield, a protected frame subfield, and an order subfield. Table 2 represents the type subfield and subtype subfield in the frame control field.

TABLE 2

| Type value B3 b2 | Type description | Subtype value b7 b6 b4 b4 | Subtype description |
|---|---|---|---|
| 00 | Data | 1101 | Reserved |
| 01 | Data | 1110 | QoS CF-Poll (no data) |
| 10 | Data | 1111 | QoS CF-Ack + CF-Poll (no data) |
| 11 | Reserved | 0000-1100 | Reserved |

In order to represent that the corresponding frame is an AP registration request frame or an AP registration response frame, reserved values of the type subfield and subtype subfield may be used. For example, the reserved value of the type subfield being 0b11 may denote inter-RAT working management. Further, the reserved value of the subtype subfield being 0b0010 may denote an AP registration request frame, and likewise, the reserved value of the subtype subfield being 0b0011 may denote an AP registration response frame.

Further, the AP registration request response frame may further include information on whether a re-transmission procedure request is made as the AP registration request fails.

Referring to FIG. 8 again, in step S210, the multi-RAT device authorizes the AP registration request received from the AP. If the multi-RAT device is in an idle mode when authorizing the AP registration request, the multi-RAT device may shift to an active mode.

If the multi-RAT device does not authorize the AP registration request, the multi-RAT device may transmit a newly defined AP registration response frame to the AP. At this time, the AP registration response frame may include a result ('failure') of the AP registration request and cause for the result. The cause for the multi-RAT device not to authorize the AP registration request may be when cannot support the request from the AP ('not support') or when the multi-RAT device and the cellular system are not in the proper state for authorizing the AP registration request and thus cannot fulfill the request from the AP ('not suitable').

If the multi-RAT device authorizes the AP's registration request, in step S220, the multi-RAT device determines whether the corresponding AP is included in a latest valid AP list. That is, in case the multi-RAT device has a latest valid AP list that has been received from a cellular node, the multi-RAT device identifies whether the AP that has requested registration is included in the AP list. Accordingly, the multi-RAT device may grasp whether the cellular node already manages the AP that has requested registration. If the multi-RAT device does not have an AP list, or if the multi-RAT device has an AP list but the AP list is invalid, the multi-RAT device may transmit a request for a latest valid AP list to the cellular node.

If the AP that has requested registration is included in a latest valid AP list, the multi-RAT device may transmit a newly defined AP registration response frame to the AP. At this time, the AP registration response frame may include a result ('already registered') of the AP registration request.

If the AP is not included in the latest valid AP list, in step S230, the multi-RAT device transmits an AP registration request message to the cellular node. The AP registration request message may include AP information such as the MAC address of the AP, SSID of the AP, whether only a limited user may use the AP (CSG/password or OSG), position of the AP, HESSID of the AP, information on the frequency channel used by the AP (operating class or channel number), which has been obtained through a Wi-Fi scanning procedure. If the cellular node is an eNB, the AP registration request message may be an RRC message. In case the cellular node is an MME, the AP registration request message may be a NAS message.

Upon receiving the AP registration request message from the multi-RAT device, the cellular node stores the AP information included in the AP registration request message. The cellular node may be implicitly aware of which coverage the corresponding AP belongs to according to the transmission path of the AP registration request message. For example, in case the cellular node is an MME, the AP registration request message is transmitted from the multi-RAT device to an eNB that provides a serving cell of the multi-RAT device, and the MME may receive the AP registration request message from the eNB. Since the MME has received the AP registration request message from the eNB, the MME may determine that the corresponding AP is within the coverage of the eNB.

In step S231, the cellular node transmits an AP registration response message to the multi-RAT device as a response to the AP registration request message. The AP registration response message includes a result of the AP's registration request. For example, the result of 0x00 denotes 'already registered,' the result of 0x01 denotes 'success,' and the result of 0x02 denotes 'failure.'

Further, the AP registration response message may include a list of registered APs. For example, if the AP that has transmitted a request for registration has been already registered, the cellular node may determine that the multi-RAT device does not have a latest valid AP list. Accordingly, by transmitting an AP registration response message including an AP list to the multi-RAT device, the multi-RAT device may be rendered to update the AP list. Or, the cellular node may transmit a registered APs list to a plurality of multi-RAT devices in a broadcast or unicast manner.

If the multi-RAT device receives an acknowledgement of the AP registration request message transmitted in step S230 or receives the AP registration response message transmitted from the cellular node in step S231 within a predetermined time, in step S240, the multi-RAT device transmits the AP registration response frame to the AP. The AP registration response frame denotes a response to the AP registration request. That is, the AP registration response frame includes a result of the AP registration request and cause for the result. For example, the result of the AP registration request being 0x00 denotes 'already registered,' the result of 0x01 denotes 'success,' and the result of 0x02 denotes 'failure.' In the embodiment described in FIG. 8, the result of the AP registration request denotes 'success.'

The cause for the result of the AP registration request may be one mainly for when the result is 'failure.' That is, if the result is 'already registered' or 'success,' the cause for result of the AP registration request may be omitted or may be set as a meaningless value. The cause for the result of AP registration request may be any one of 'not support', 'not suitable', 'not response with retry procedure', 'not response without retry procedure', and 'not registered.'

In case the multi-RAT device fails to receive an acknowledgment of the AP registration request message or fails to receive the AP registration response message from the cellular node within a predetermined time, the multi-RAT device transmits the AP registration response frame to the AP, thereby performing a retransmission procedure. At this time, the AP registration response frame may include a result of the AP registration request ('failure') and cause for the result ('not response with retry procedure'). In case of failing to receive an acknowledgment of the AP registration request message or failing to receive the AP registration response message from the cellular node within a predetermined time despite attempting the retransmission procedure by the maximum number of times of retransmission, the multi-RAT device may transmit the AP registration response frame to the AP. At this time, the AP registration response frame may include a result of the AP registration request ('failure') and cause for the result ('ot response without retry procedure').

Upon receiving the AP registration response frame whose result is 'already registered' or 'success' from the multi-RAT device, the AP may determine that its request has been successfully done. Upon receiving the AP registration response frame with a result of 'failure' and cause for the result of 'not support,' 'not suitable,' or 'not response without retry procedure' from the multi-RAT device, the AP may retransmit a request for AP registration to another multi-RAT device. Upon receiving the AP registration response frame with a result of 'failure' and cause for result of 'not response with retry procedure,' from the multi-RAT device, the AP may await an additional response from the corresponding multi-RAT device. Upon receiving the AP registration response frame with a result of 'failure' and cause for result of 'not registered,' from the multi-RAT device, the AP may stop transmitting a request for AP registration.

Figure 10:
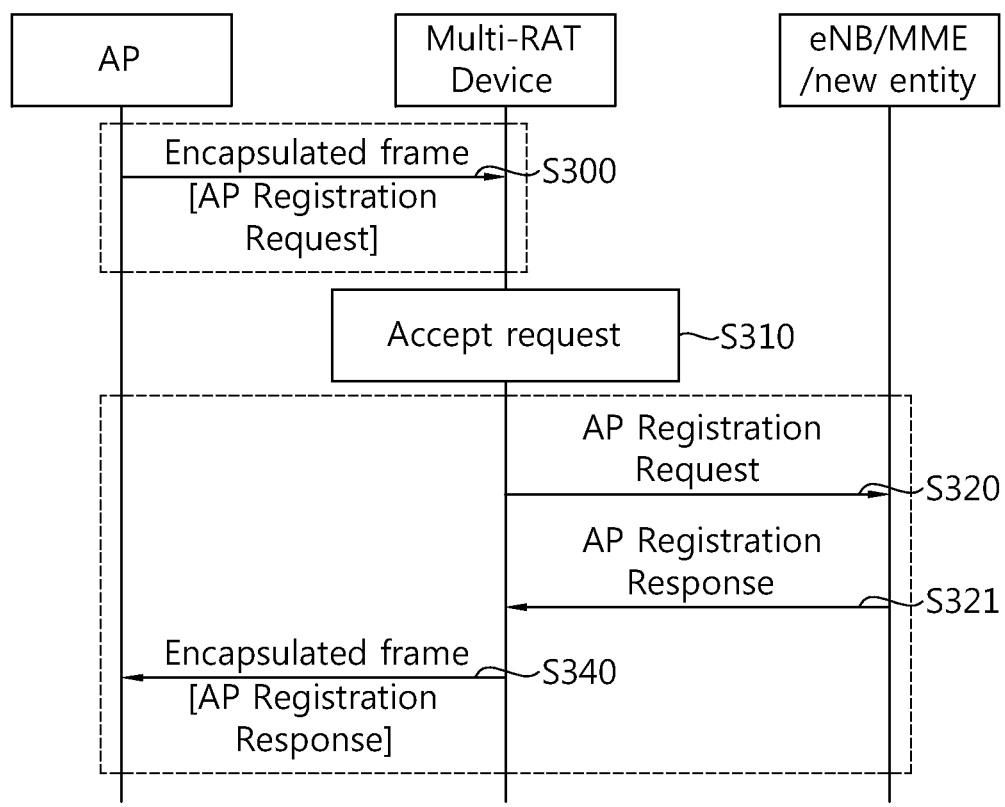
FIG. 10 shows an AP registration method according to another embodiment of the present invention.

FIG. 10 shows an AP registration method according to another embodiment of the present invention. In the embodiment described in FIG. 10, an AP registration method is described where an AP defines a new independent message, which is independent with a Wi-Fi system, and requests its registration. The AP registration request/response transmitted from the AP is encapsulated in a Wi-Fi system frame and is then transmitted.

In step S300, the AP transmits an encapsulated frame including an AP registration request to the multi-RAT device. The AP registration request may be an AP registration request message. The AP registration request message may be defined by a protocol scheme with the cellular node. That is, the AP registration request message is encapsulated in the frame body field of an IEEE 802.11 frame and is then transmitted. Accordingly, the AP registration request message is defined independently from the Wi-Fi system frame. The AP registration request message may include AP information such as the MAC address of the AP, SSID of the AP, whether only a limited user may use the AP (CSG/password or OSG), position of the AP, HESSID of the AP, information on the frequency channel used by the AP (operating class or channel number), which has been obtained through a Wi-Fi scanning procedure. Further, by using the type subfield or subtype subfield in the frame control field or the address field in the MAC header of the frame including the encapsulated AP registration request message, it may be notified to the multi-RAT device that the corresponding frame should be transmitted to the cellular node. Further, the AP registration request message may further include information on whether a re-transmission procedure request is made as the AP registration request fails.

In step S310, the multi-RAT device authorizes the AP registration request received from the AP. This means that the multi-RAT device may deliver (forward) the frame received from the AP to the cellular node. If the multi-RAT device is in an idle mode when authorizing the AP registration request, the multi-RAT device may shift to an active mode.

If the multi-RAT device does not authorize the AP registration request, the multi-RAT device may transmit a frame having a newly defined AP registration response message encapsulated therein to the AP. At this time, the AP registration response message may include a result ('failure') of the AP registration request and cause for the failure. The cause for the multi-RAT device not to authorize the AP registration request may be when cannot support the request from the AP ('not support') or when the multi-RAT device and the cellular system are not in the proper state for authorizing the AP registration request and thus cannot fulfill the request from the AP ('not suitable'). At this time, the AP may retransmit a request for AP registration to other multi-RAT devices.

If the type subfield or subtype subfield in the frame control field or the address field in the MAC header in the received frame indicate that the frame is one that should be transmitted to the cellular node, in step S320, the multi-RAT device transmits the AP registration request message included in the body of the corresponding frame to the cellular node.

Upon receiving the AP registration request message from the multi-RAT device, the cellular node stores the AP information included in the AP registration request message. The cellular node may be implicitly aware of which coverage the corresponding AP belongs to according to the transmission path of the AP registration request message. For example, if the cellular node is an MME, the AP registration request message is transmitted from the multi-RAT device to an eNB that provides a serving cell of the multi-RAT device, and the MME may receive the AP registration request message from the eNB. Since the MME has received the AP registration request message from the eNB, the MME may determine that the corresponding AP is within the coverage of the eNB.

In step S321, the cellular node transmits an AP registration response message to the multi-RAT device as a response to the AP registration request message. The AP registration response message includes a result of the AP registration request. For example, the result of 0x00 denotes 'already registered,' the result of 0x01 denotes 'success,' and the result of 0x02 denotes 'failure.' Further, the cellular node may inform the multi-RAT device that the AP registration response message is a message that should be transmitted to the AP.

If the received AP registration response message is a message that should be transmitted to the AP, in step S340, the multi-RAT device transmits an encapsulated frame including the AP registration response message to the AP.

Upon receiving the frame including the AP registration response message with a result of 'already registered' or 'success' from the multi-RAT device, the AP may determine that its request has been successfully done. Upon receiving the frame including the AP registration response message with a result of 'failure' or failing to receive a response within a predetermined time from the multi-RAT device, the AP may retransmit a request for AP registration to the same or other multi-RAT devices.

Hereinafter, an AP registration procedure which is initiated by a general device according to an embodiment of the present invention is described.

Figure 11:
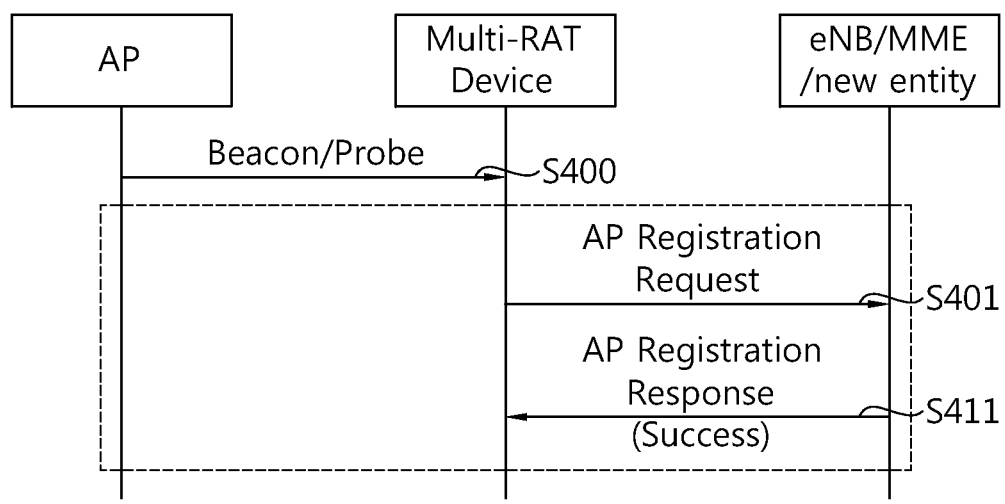
FIG. 11 shows an AP registration method according to another embodiment of the present invention.

FIG. 11 shows an AP registration method according to another embodiment of the present invention. In the embodiment described in FIG. 11, the general device access to a Wi-Fi system, and accordingly, automatically performs AP registration. That is, if the general device discovers an AP through scanning, the general device transmits a request for AP registration to a cellular node.

In step S400, the AP transmits a beacon frame or probe frame. The multi-RAT device may detect the beacon frame or probe frame transmitted from the AP by scanning. If the multi-RAT device is in an idle mode, the multi-RAT device may shift to an active mode.

In step S401, the multi-RAT device requests AP registration by transmitting an AP registration request message to the cellular node. The AP registration request message may include AP information such as the MAC address of the AP, SSID of the AP, whether only a limited user may use the AP (CSG/password or OSG), position of the AP, HESSID of the AP, information on the frequency channel used by the AP (operating class or channel number), which has been obtained through a Wi-Fi scanning procedure.

Upon receiving the AP registration request message from the multi-RAT device, the cellular node stores the AP information included in the AP registration request message.

The cellular node may be implicitly aware of which coverage the corresponding AP belongs to according to the transmission path of the AP registration request message. For example, if the cellular node is an MME, the AP registration request message is transmitted from the multi-RAT device to an eNB that provides a serving cell of the multi-RAT device, and the MME may receive the AP registration request message from the eNB. Since the MME has received the AP registration request message from the eNB, the MME may determine that the corresponding AP is within the coverage of the eNB.

In step S411, the cellular node transmits the AP registration response message to the multi-RAT device as a response to the AP registration request message. The AP registration response message includes a result of the AP registration request. For example, the result of 0x00 denotes 'already registered,' the result of 0x01 denotes 'success,' and the result of 0x02 denotes 'failure.' In the embodiment described in FIG. 11, the result of AP registration request denotes 'success.'

Further, the AP registration response message may include a list of registered APs. For example, if an AP that has transmitted a request for registration has been already registered, the cellular node may determine that the multi-RAT device does not have a latest valid AP list. Accordingly, by transmitting an AP registration response message including an AP list to the multi-RAT device, the multi-RAT device may be rendered to update the AP list. Or, the cellular node may transmit a registered APs list to a plurality of multi-RAT devices in a broadcast or unicast manner.

Upon receiving the AP registration response message with a result of 'already registered' or 'success' from the cellular node within a predetermined time, the multi-RAT device may determine that the AP registration has been successfully done. Upon receiving the AP registration response message with a result of 'failure' from the cellular node within a predetermined time, the multi-RAT device may determine that the AP registration has failed. When failing to receive the AP registration response message from the cellular node within a predetermined time, the multi-RAT device may perform retransmission procedure by the maximum number of times for retransmission.

Figure 12:
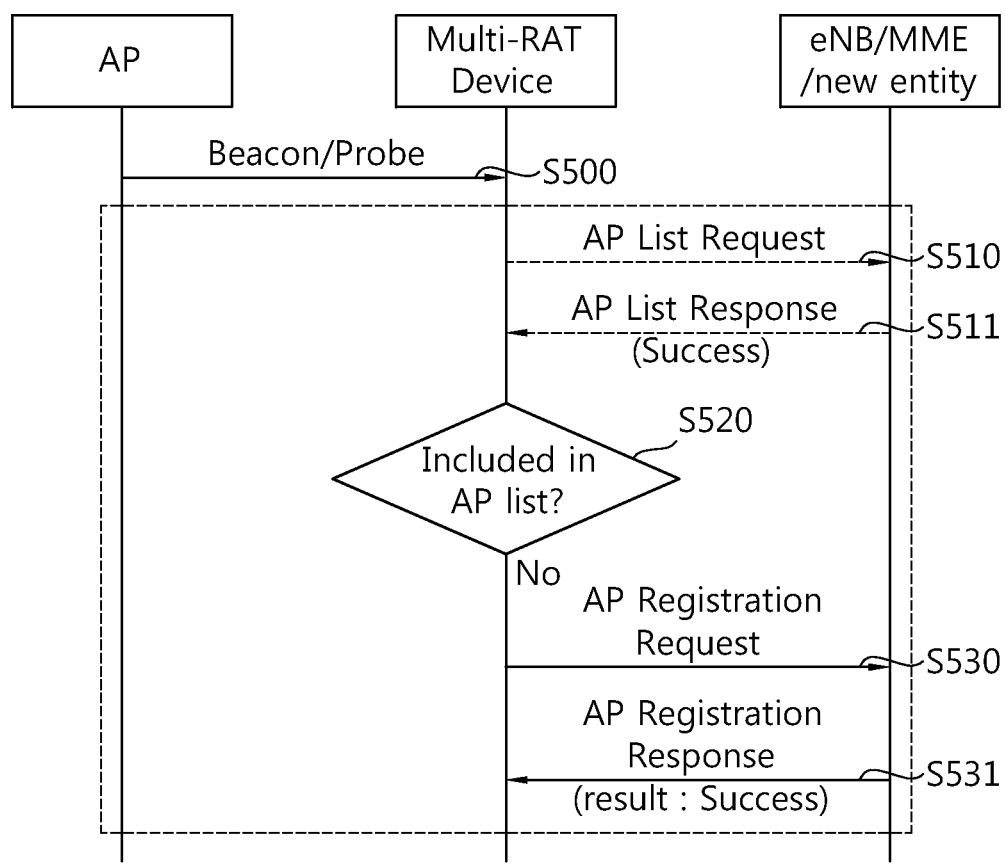
FIG. 12 shows an AP registration method according to another embodiment of the present invention.

FIG. 12 shows an AP registration method according to another embodiment of the present invention. In the embodiment described in FIG. 12, a method is described where a general device performs AP registration based on an AP list received from a cellular node. If the general device has a latest valid AP list received from the cellular node, the general device may identify whether an AP discovered through scanning is included in the AP list. If there is no latest valid AP list received from the cellular node, the general device may transmit a request for a latest valid AP list to the cellular node. The general device may transmit a request for registering the corresponding AP to the cellular node only when the corresponding AP is not included in the latest valid AP list.

In step S500, the AP transmits a beacon frame or a probe frame. The multi-RAT device may detect the beacon frame or probe frame transmitted from the AP by scanning. If the multi-RAT device is in an idle mode, the multi-RAT device may shift to an active mode.

In step S510, the multi-RAT device may transmit a request for a latest valid AP list to the cellular node. The multi-RAT device may transmit a request for the latest valid AP list only when the multi-RAT device fails to receive the latest valid AP list from the cellular node. In step S511, the cellular node transmits the latest valid AP list to the multi-RAT device.

In step S520, the multi-RAT device determines whether the corresponding AP discovered through scanning is included in the latest valid AP list. That is, the multi-RAT device may verify whether the corresponding AP, discovered by scanning, is already managed by the cellular node. If the AP is included in the latest valid AP list, the multi-RAT device does not request registration of the AP.

If the AP is not included in the latest valid AP list, in step S530, the multi-RAT device requests registration of the AP by transmitting an AP registration request message to the cellular node. The AP registration request message may include AP information such as the MAC address of the AP, SSID of the AP, whether only a limited user may use the AP (CSG/password or OSG), position of the AP, HESSID of the AP, information on the frequency channel used by the AP (operating class or channel number), which has been obtained through a Wi-Fi scanning procedure.

Upon receiving the AP registration request message from the multi-RAT device, the cellular node stores the AP information included in the AP registration request message. The cellular node may be implicitly aware of which coverage the corresponding AP belongs to according to the transmission path of the AP registration request message. For example, in case the cellular node is an MME, the AP registration request message is transmitted from the multi-RAT device to an eNB that provides a serving cell of the multi-RAT device, and the MME may receive the AP registration request message from the eNB. Since the MME has received the AP registration request message from the eNB, the MME may determine that the corresponding AP is within the coverage of the eNB.

In step S531, the cellular node transmits an AP registration response message to the multi-RAT device as a response to the AP registration request message. The AP registration response message includes a result of the AP registration request. For example, the result of 0x00 denotes 'already registered,' the result of 0x01 denotes 'success,' and the result of 0x02 denotes 'failure.' In the embodiment described in connection with FIG. 12, the result of the AP registration request denotes 'success.'

Further, the AP registration response message may include a list of registered APs. For example, if an AP that has transmitted a request for registration has been already registered, the cellular node may determine that the multi-RAT device does not have a latest valid AP list. Accordingly, by transmitting an AP registration response message including an AP list to the multi-RAT device, the multi-RAT device may be rendered to update the AP list. Or, the cellular node may transmit a registered APs list to a plurality of multi-RAT devices in a broadcast or unicast manner.

Upon receiving the AP registration response message with a result of 'already registered' or 'success' from the cellular node within a predetermined time, the multi-RAT device may determine that the AP registration has been successfully done. Upon receiving the AP registration response message with a result of 'failure' from the cellular node within a predetermined time, the multi-RAT device may determine that the AP registration has failed. Upon failing to receive the AP registration response message from the cellular node within a predetermined time, the multi-RAT device may perform retransmission procedure by the maximum number of times for retransmission.

Hereinafter, an AP registration procedure which is initiated by a cellular node according to an embodiment of the present invention is described. The AP registration procedure initiated by the cellular node may be described in addition to the AP registration procedure that is initiated by a general device as described above.

In case of AP automatic registration according to Wi-Fi access, when a general device that has received a heterogeneous network information request from the cellular node discovers an AP through scanning, the general device may transmit a request for registration of the corresponding AP to the cellular node. In case of AP registration based on a latest valid AP list received from the cellular node, when the general device that has received a heterogeneous information request from the cellular node has a latest valid AP list, the general device may verify whether the AP discovered through scanning is included in an AP list. If there is no latest valid AP list received from the cellular node, the general device may transmit a request for a latest valid AP list to the cellular node. The general device may transmit a request for registration of the AP to the general device only when the AP is not included in the latest valid AP list. Or, when receiving a message with the latest valid AP list and AP registration flag set as 1 from the cellular node, the general device may identify whether the AP discovered through scanning is included in the AP list. The general device may transmit a request for registration of the AP to the cellular node only when the AP is not included in the latest valid AP list.

Hereinafter, an AP information update configuration is described.

A cellular node may inform an update configuration on an AP information through an AP registration response message. The update configuration may represent an update scheme. The update scheme may be generally classified into periodic transmission and aperiodic transmission. If the update scheme is periodic transmission, the cellular node may transmit parameters such as update transmission period through an AP registration response message. The AP or multi-RAT device may periodically transmit changed AP information to the cellular node. If the update scheme is aperiodic transmission, the AP or multi-RAT device may transmit the changed AP information to the cellular node only when update conditions are met. The changed AP information may be transmitted through an AP information update request/response message.

The update conditions may be associated with a change in Wi-Fi system information. For example, when at least one of AP's MAC address, AP's SSID, whether the AP is used only by a limited user (CSG/password or OSG), AP's HESSID, information on frequency channel used by the AP (operating class, channel number, etc.), power ON/OFF, power ON duration, power OFF duration, and AP's position is changed, the update conditions may be satisfied. The power ON/OFF is a parameter to notify the power ON/OFF state of an AP already registered in the cellular node. For example, if some AP tries to power off or multi-RAT device explicitly or implicitly recognizes the situation where the AP's to power off, the corresponding information may be updated in the cellular node. A re-registration procedure may be performed when powered-off AP powers back on. Further, if power is temporarily off, for example, due to software upgrade, the power-off duration may be additionally informed, so that the cellular node may be aware of the time when the AP is re-powered. At this time, no re-registration procedure may be needed for the AP.

Figure 13:
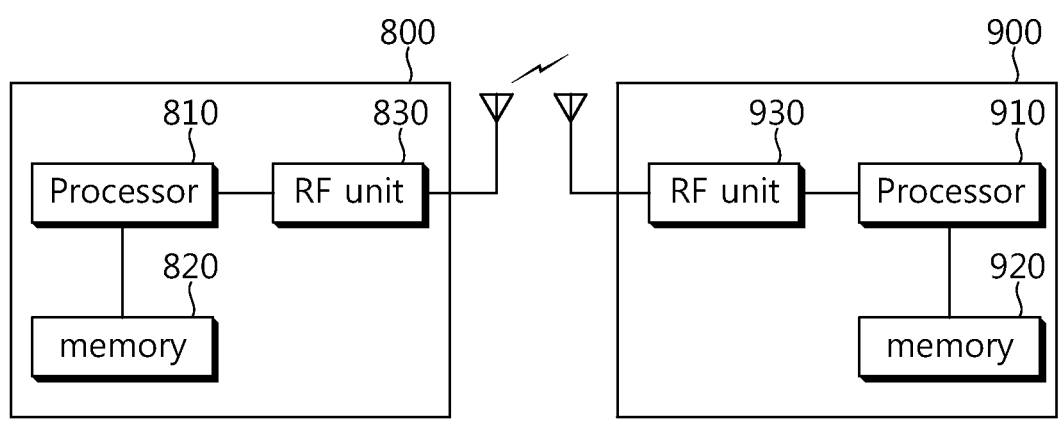
FIG. 13 is a block diagram showing wireless communication system to implement an embodiment of the present invention.

FIG. 13 is a block diagram showing wireless communication system to implement an embodiment of the present invention.

A general device 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An AP or cellular node 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of registering, by a multi radio access technology (RAT) device supporting a plurality of RATs, an entity of a secondary RAT system in a management device of a primary RAT system in a wireless communication system, the method comprising:

receiving a request for registration of an entity of a secondary RAT system from the entity of the secondary RAT system;

if the request for registration is authorized, determining whether the entity of the secondary RAT system is included in a list of entities of the secondary RAT system registered in a management device of a primary RAT system;

if it is determined that the entity of the secondary RAT system is not included in the list, transmitting a registration request message including information on the entity of the secondary RAT system to the management device of the primary RAT system;

receiving a registration response message including a result of the request for registration of the entity of the secondary RAT system from the management device of the primary RAT system; and transmitting a registration result parameter including the result of the registration of the entity of the secondary RAT system to the entity of the secondary RAT system, wherein the primary RAT system is a cellular system, and the management device of the primary RAT system is one of an eNodeB (eNB) or a mobility management entity (MME), wherein the secondary RAT system is a Wi-Fi system, and the entity of the secondary RAT system is an access point (AP), and wherein the information on the entity of the secondary RAT system includes a media access control (MAC) address of the entity of the secondary RAT system, a service set identifier (SSID) of the entity of the secondary RAT system, a position of the entity of the secondary RAT system, an homogeneous extended service set ID (HESSID) of the entity of the secondary RAT system, whether of the entity of the secondary RAT system can be used by a limited user, and information on a frequency channel used by the entity of the secondary RAT system.

2. The method of claim 1, wherein the request for registration of the entity of the secondary RAT system is an AP registration request flag included in a beacon frame, a probe response frame, an authentication response frame, or an association response frame.

3. The method of claim 1, wherein the request for registration of the entity of the secondary RAT system is a newly defined AP registration request frame.

4. The method of claim 1, wherein the result of the request for registration of the entity of the secondary RAT system is one of 'already registered,' 'success,' or 'failure'.

5. The method of claim 4, wherein if the result of the request for registration of the entity of the secondary RAT system is 'failure,' the registration result parameter further includes cause for the result of the request for registration.

6. A multi radio access technology (RAT) device supporting a plurality of RATs and configured to register an entity of a secondary RAT system in a management device of a primary RAT system in a wireless communication system, the multi RAT device comprising:

a transceiver; and
a processor operatively connected to the transceiver and configured to:
receive a request for registration of an entity of a secondary RAT system from the entity of the secondary RAT system;
if the request for registration is authorized, determine whether the entity of the secondary RAT system is included in a list of entities of the secondary RAT system registered in a management device of a primary RAT system;
if it is determined that the entity of the secondary RAT system is not included in the list, transmit a registration request message including information on the entity of the secondary RAT system to the management device of the primary RAT system;
receive a registration response message including a result of the request for registration of the entity of the secondary RAT system from the management device of the primary RAT system; and
transmit a registration result parameter including the result of the registration of the entity of the secondary RAT system to the entity of the secondary RAT system, wherein the primary RAT system is a cellular system, and the management device of the primary RAT system is one of an eNodeB (eNB) or a mobility management entity (MME),
wherein the secondary RAT system is a Wi-Fi system, and the entity of the secondary RAT system is an access point (AP), and
wherein the information on the entity of the secondary RAT system includes a media access control (MAC) address of the entity of the secondary RAT system, a service set identifier (SSID) of the entity of the secondary RAT system, a position of the entity of the secondary RAT system, an homogeneous extended service set ID (HESSID) of the entity of the secondary RAT system, whether of the entity of the secondary RAT system can be used by a limited user, and information on a frequency channel used by the entity of the secondary RAT system.

* * * * *